United States Patent [19]

Miura et al.

[11] Patent Number: 5,898,877
[45] Date of Patent: Apr. 27, 1999

[54] PROCESSOR USING SPECIAL INSTRUCTION SET TO ENHANCE EXCEPTION HANDLING

[75] Inventors: Hiroki Miura, Warabi; Yasuhito Koumura, Tokyo; Kenshi Matsumoto, Koshigaya, all of Japan

[73] Assignee: Sanyo Electric Co., Ltd., Osaka, Japan

[21] Appl. No.: 08/804,912

[22] Filed: Feb. 25, 1997

[30] Foreign Application Priority Data

Feb. 29, 1996 [JP] Japan .................................. 8-042724

[51] Int. Cl.⁶ .................................................. G06F 9/38
[52] U.S. Cl. ................................................................ 395/733
[58] Field of Search ................................... 395/376, 580, 395/733

[56] References Cited

U.S. PATENT DOCUMENTS

| | | | |
|---|---|---|---|
| 4,509,116 | 4/1985 | Lackey et al. | 395/1 |
| 5,050,068 | 9/1991 | Dollars et al. | 395/382 |
| 5,142,634 | 8/1992 | Fite et al. | 395/587 |
| 5,218,711 | 6/1993 | Yoshida | 395/800.34 |
| 5,297,263 | 3/1994 | Ohtsuka et al. | 395/591 |
| 5,742,780 | 4/1998 | Caulk | 395/382 |

OTHER PUBLICATIONS

High Performance and Low–Power–Consumption 32–bit RISC Single Chip Microcomputer V851, NEC Microcomputer System, Ltd., pp. 42–47.

*Primary Examiner*—David Y. Eng
*Attorney, Agent, or Firm*—Loeb & Loeb LLP

[57] ABSTRACT

A processor uses a special instruction set to enhance exception handling, such as interrupt handling. The processor uses a pipeline comprising five separate stages of fetch, decode, execute, memory access and register write. For each operation executed by the processor, the operation has an operation initiation instruction and an operation result fetch instruction, each of which has multiple stages. The operation result fetch instruction awaits the completion of the operation initiation instruction. While waiting, the operation result fetch instruction is suspended, preferably before any hardware resource is changed, and if necessary canceled to accommodate an exception handling signal. Since the hardware resource is changed at the "execute" stage of the operation, the operation result fetch instruction is suspended at the "decode" stage. Upon receiving the exception handling signal, the operation result fetch instruction may be canceled and the processor is free to process the exception handling. After completion of the exception handling, the operation result fetch instruction is re-executed from the beginning.

21 Claims, 6 Drawing Sheets

PROCESSOR USING SPECIAL INSTRUCTION SET TO ENHANCE EXCEPTION HANDLING

BACKGROUND OF THE INVENTION

1. Field of the Invention

This invention relates to an operation execution method and an apparatus employing the operation execution method. This invention has possible applications in pipelined microprocessors, for example.

2. Description of the Prior Art

A single-chip RISC (Reduced Instruction Set Computer) is a device for simultaneously realizing high processing performance, low power consumption, and a small mounting area, primarily in specific applications. Recently, a dedicated arithmetic logic circuit has often been provided in this type of microprocessor to further enhance the arithmetic performance.

One example of this type of microprocessor is the V851 produced by NEC, Ltd. According to NEC Technology Report (Vol. 48, No. 3/1995, pages 42–47), the V851 adopts a pipelined RISC architecture that includes, in addition to an ordinary ALU, a hardware multiplier unit called an MULU for high speed execution of multiplication instructions. A multiplication operation is executed by this multiplier unit in one or two clock cycles.

FIG. 1 shows a state of the pipeline processing by the V851. The figure shows a state where instruction 1 is completed in one clock cycle using the MULU, and subsequent instruction 2 is pipeline processed one clock cycle later. A process corresponding to each clock cycle in the figure is called a stage, and the execution of one instruction is completed after passing through five stages. In the V851, the five stages are called IF, ID, EX, MEM, and WB, where each stage respectively signifies instruction fetch, instruction decode (and register read), operation execution (and memory address generation), memory access (multiplication result fetch), and write back of data for a register file.

In designing a pipelined microprocessor, several different design approaches are available regarding the acceptance of exception processing, such as interrupts. In particular, when providing a dedicated execution circuit such as an arithmetic logic circuit, a design suited for the circuit's characteristics becomes necessary. The major control methods when requests for operation execution and exception processing are generated simultaneously are given below.

(1) Have the exception processing wait

Once the operation has been initiated, the exception processing is made to wait until the execution of the operation completes, and the exception processing is performed after the completion of the operation.

(2) Suspend the operation

The operation is suspended so as to give priority to the exception processing, and the intermediate result of the operation is canceled. After completion of the exception processing, the operation is again performed from the beginning.

(3) Interrupt the operation

The operation is temporarily interrupted, and the intermediate result of the operation is saved. After completion of the exception processing, the saved data is read back and the operation is resumed from the point of interruption.

Among these methods, (1) is the simplest in terms of design and has light hardware requirements, although there is a risk of an urgent exception processing being made to wait for a long period of time, thereby creating a problem in the system. Although method (2) does not have this problem, operations are again executed from the beginning, thereby creating a problem in processing performance. Method (3) does not have these problems, although hardware requirements for implementation increase. For example, in the aforementioned V851, method (1) may be considered practical if an operation requires only a maximum of two clock cycles. However, method (2) or (3) would be the only choices if an execution circuit is provided for floating point arithmetic to handle multi-bit data, for example.

SUMMARY OF THE INVENTION

This invention takes the aforementioned problems into consideration, the object being to provide an operation execution method and apparatus which obviate having an exception processing wait unnecessarily, minimize a drop in processing performance, and do not bring about an increase in hardware requirements.

(1) The operation execution method in this invention executes operations furnished in the form of instructions, separately provides an operation initiation instruction for initiating an operation and an operation result fetch instruction for fetching the result of the operation, judges through hardware the completion of execution of the operation initiated by the operation initiation instruction, and, until the execution of the operation completes, suspends the execution of a subsequent corresponding operation result fetch instruction in a state where the operation result fetch instruction itself can be canceled.

The term "operation" herein is not limited to numerical operations, and signifies in general a unit process of various control functions. Furthermore, in this invention, the "execution" of an instruction has two meanings. Namely, one is an execution in a broad sense signifying a sequence of processes from reading and decoding the instruction, and performing control operations with respect to actual hardware resources according to the decoded instruction, until the instruction completes. The other is an execution in a narrow sense signifying only the actual control with respect to the aforementioned hardware resources. The start of the execution of an instruction in the narrow sense is hereinafter also called "issuance of the instruction". Hereinafter, the broad sense of the meaning will be explicitly described only where such distinction is necessary.

In this invention, operation initiation and fetching of an operation result are performed by different instructions. Since the operation initiation instruction is intended only to initiate an operation, the execution of the instruction itself completes the moment the operation is initiated. However, the operation itself is carried out after the operation initiation instruction completes and the completion of the operation is judged through hardware.

On the other hand, the execution (broad sense) of an operation result fetch instruction can be started even before the operation completes since the execution of the operation initiation instruction itself has completed. However, since it is necessary for this instruction to wait for the completion of the operation, its execution (narrow sense) suspends until the operation completes. While it suspends, if a request for an exception processing is generated, for example, the suspended operation result fetch instruction is canceled, and the relevant process is executed first. The term "cancel" means to give up the execution of an instruction. At this time, since it is not necessary to stop or cancel the aforementioned operation itself, it is possible to re-execute only the operation result fetch instruction after exception processing or the like is completed or performed.

According to this invention, exception processing is not made to wait long. Even if exception processing is generated, it is not necessary to re-execute the operation initiated by the operation initiation instruction, and the processing performance does not drop. The hardware does not become complex or excessively large.

(2) On the other hand, the operation execution apparatus of this invention includes an operation execution section in which an operation is initiated by the operation initiation instruction and an operation result is fetched by the operation result fetch instruction, an operation completion decision section for judging through hardware the completion of execution of the operation that was initiated by the operation initiation instruction, and a fetch instruction execution suspending section for suspending, until the execution of the operation completes, the execution of a subsequent corresponding operation result fetch instruction in a state where the operation result fetch instruction itself can be canceled. An example of the operation execution section is a coprocessor which executes specific operations.

In this aspect, when the operation initiation instruction is first read, an operation is initiated in the operation execution section. The completion of execution of this operation is judged by the operation completion decision section. Next, the operation result fetch instruction is read. However, the execution (narrow sense) of this instruction is suspended until the execution of the operation completes. The operation result fetch instruction is suspended in a state where the instruction itself can be canceled, such as at a stage no later than a point where decoding ends. Therefore, if a request for exception processing is generated, it can be processed with priority with the operation result fetch instruction being canceled. Thereafter, the operation result fetch instruction is re-executed from the beginning, and the operation result is fetched from the operation execution section.

According to this aspect, since operation completion is judged through hardware, there is almost no drop in performance due to overhead.

(3) In one aspect of this invention, this apparatus further includes a reservation section for making a reservation to use the aforementioned operation execution section when the operation initiation instruction has been decoded, and an initiation instruction suspending section for suspending the execution of the operation initiation instruction according to the condition of the reservation.

In this aspect, when the operation initiation instruction has been decoded, it becomes clear that the operation execution section is to be used so this is reserved by the reservation section. A reservation can be realized, for example, simply by incrementing a count value of a counter. The initiation instruction suspending section suspends the execution of the operation initiation instruction according to the condition of this reservation. When there are many reservations, the execution of the operation initiation instruction that was just decoded may be immediately suspended, for example, or the instruction may be issued normally and the execution of the next instruction may be suspended.

When the apparatus includes a pipeline control section, the suspension of the execution of the operation result fetch instruction can be performed at an appropriate pipeline stage. The implementation is easy for a person skilled in the art.

When the execution of the operation result fetch instruction is suspended at a stage no later than the stage where the instruction is to be decoded, the hardware resources remain unchanged. Therefore, exception processing, if it arises, can be performed smoothly.

When suspending the execution of the operation initiation instruction while taking into consideration the condition of the reservation for the operation execution section, the data input for the operation execution section is reserved even when the data input is at a late stage of the pipeline so that the input of data for the operation execution section will not overflow. If the operation execution section has a FIFO structure, an instruction, once issued, can be guaranteed to be executed until completion.

(4) Another aspect of this invention is an apparatus for executing operations through pipeline processing. This apparatus includes a main path for pipeline processing, and a subpath, which is a detour around part of the main path, for assuming part of the processing. The subpath includes the operation execution section in which an operation is initiated by the operation initiation instruction, and the operation result is fetched by the operation result fetch instruction. On the other hand, the main path includes the operation completion decision section for judging through hardware the completion of execution of the operation that was initiated by the operation initiation instruction, and the fetch instruction execution suspending section for suspending, until the execution of the operation completes, the execution of a subsequent operation result fetch instruction in a state where the operation result fetch instruction itself can be canceled.

The "main path" signifies a path formed through the cooperation of various processing units for the basic flow of the pipeline processing, such as that formed by a main processor. On the other hand, the "subpath" is formed by a coprocessor, for example.

DETAILED DESCRIPTION OF THE PREFERRED EMBODIMENT

Figure 1:
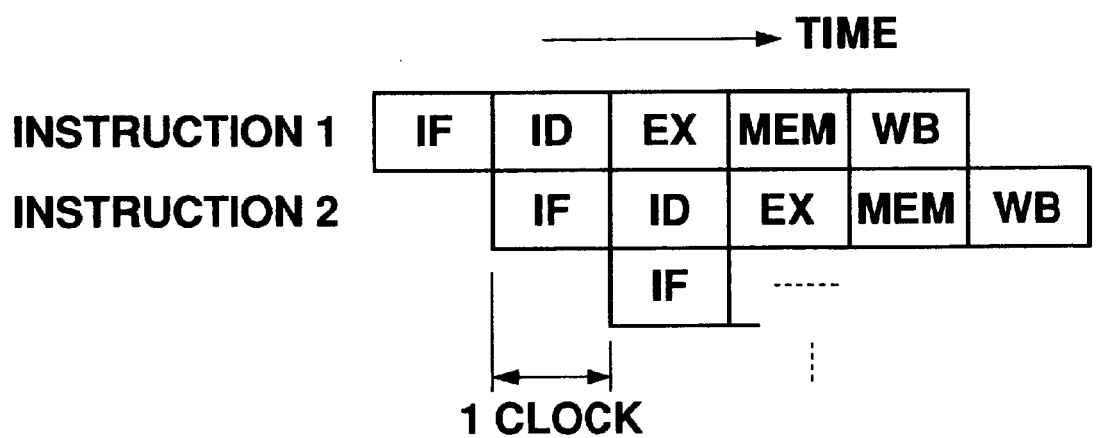
FIG. 1: Figure showing a state of pipeline processing in V851.

A preferred embodiment of the operation execution apparatus of this invention is described here with reference to the drawings. The description of this apparatus also clarifies the operation execution method related to this invention. In this embodiment, a pipelined microprocessor is considered for the operation execution apparatus. A section corresponding to the MULU in the V851 is implemented by a coprocessor.

A general pipeline structure will first be described. The operation execution apparatus of this embodiment executes instructions through pipeline processing by dividing them into multiple stages. This apparatus includes stage processing sections, which form a main path for the pipeline process, for handling the respective processing stages, and an operation execution section, provided on a subpath which detours around a part of the main path, for executing predetermined operations in a direction of flow opposite to that of the processing in the main path. Although a general arithmetic logic section may be provided on the main path, it will be considered a different section from the operation execution section described herein.

More concretely, this apparatus includes a processor for executing instructions through pipeline processing and a coprocessor for assuming the execution of predetermined operations among the processes by the processor. The coprocessor is connected to the processor in an opposite direction so that the flow of processing by the coprocessor is in a direction opposite to the flow of processing by the aforementioned processor. Thus, the assignment of an operation from processor to coprocessor, namely, the transfer of the operation identification and of data to be handled by the operation is performed at a stage in the pipeline subsequent to reading out of the operation result that was performed by the coprocessor. The result is a secondary effect where the initiation of processing in the coprocessor is delayed, and the pipeline processing by the processor advances ahead by the amount of the delay. Furthermore, the operation result of the coprocessor can be directly transferred to a location requiring the result.

In this apparatus, the pipeline processing by the processor includes a memory access stage as one of its stages. The processor includes a memory access section which takes the initiative in controlling the memory access stage. A data input unit of the coprocessor is connected to a data output unit of the memory access section, and a data output unit of the coprocessor is connected to a data input unit of the memory access section. Results of operations by the coprocessor can be used directly by the memory access section.

In this apparatus, the processor further comprises an instruction fetch section, an instruction decode section, a general execution section, a memory access section, and a register write section for handling the pipeline processing of instructions in the respective stages. The data input section of the coprocessor is connected to the data output unit of the memory access section, and the data output unit of the coprocessor is connected to the data input unit of the memory access section, respectively through dedicated buses.

The pipeline in this apparatus comprises five stages: I (instruction fetch), R (instruction decode and general-purpose register read), A (operation by ALU), M (memory access), and W (register write). The "issuance of an instruction" is synonymous with the migration from stage R to stage A.

Configuration

Figure 2:
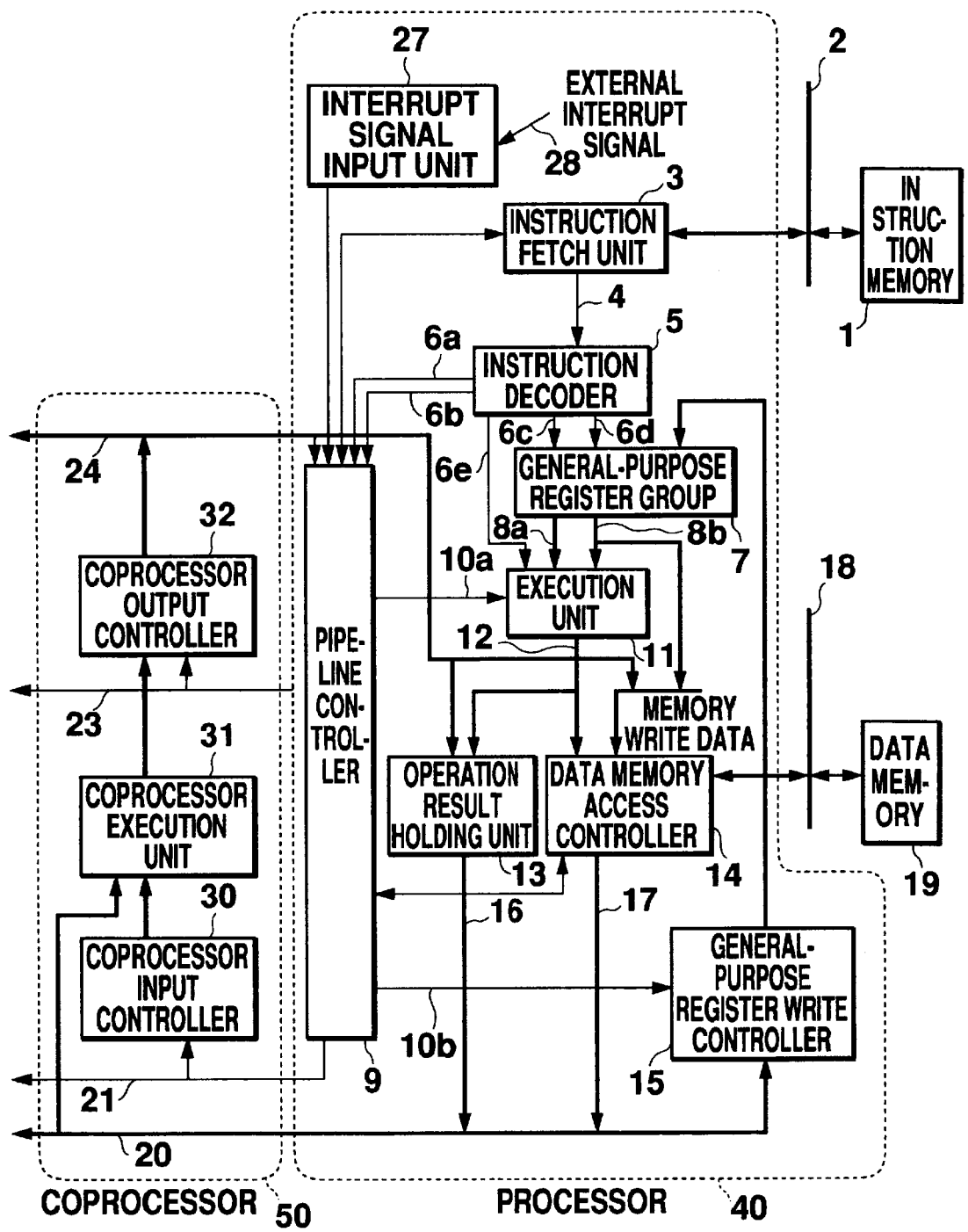
FIG. 2: General block diagram of an operation execution apparatus related to this embodiment.

FIG. 2 is a basic block diagram of the apparatus. The apparatus basically comprises a processor 40 for generally executing ordinary processes, a coprocessor 50 corresponding to the MULU in the V851, an instruction memory 1 for storing instructions that processor 40 is to execute, and a data memory 19 for storing data to be processed by processor 40. Instructions are loaded into processor 40 through an instruction memory bus 2. Data is read from and written to processor 40 through a data memory bus 18.

Processor 40 includes an instruction fetch unit 3 for fetching instructions from instruction memory bus 2 and an instruction decoder 5 for receiving and decoding instruction words from instruction fetch unit 3. These units correspond to stage I and the first half of stage R.

At instruction decoder 5, an instruction word is decoded according to the type of instruction, and a function code 6a indicating the function of the operation to be processed, an immediate operand 6b which is a constant operand embedded in the instruction word, two source register numbers 6c and 6d, one destination register number 6e, and so forth, are extracted.

Source register numbers 6c and 6d are sent to general-purpose register group 7. In this embodiment, the registers in general-purpose register group 7 are called R0, R1, and so forth. The contents of registers corresponding to source register numbers 6c and 6d are fetched from general-purpose register group 7 and sent to an execution unit 11 as source operands 8a and 8b. This represents the second half of stage R. Execution unit 11 is an ordinary ALU found in general processors and corresponds to stage A.

On the other hand, function code 6a is sent to a pipeline controller 9. As shown in the same figure, pipeline controller 9 monitors the state of the entire apparatus, controls stage progress, and decides the issuance timing for the individual instructions.

When it becomes possible for an instruction to be issued, function code 6a is sent as a function code 10a to execution unit 11. At execution unit 11, an operation is performed according to function code 10a furnished from pipeline controller 9, using necessary values from source operands 8a and 8b obtained from the general-purpose registers and immediate operand 6b. The significance of an operation to be executed at execution unit 11 differs depending on the type of instruction.

If the instruction is an operation instruction, for example, the operation indicated by the instruction is executed by execution unit 11. The operation result is stored into an operation result holding unit 13. An operation result 16 is sent to general-purpose register group 7 through a general-purpose register write controller 15. At this time, as a register number of the write destination, destination register number 6e of the instruction is sent out as a destination register number 10b at an appropriate timing by pipeline controller 9. General-purpose register write controller 15 performs a write operation to the general-purpose register using destination register number 10b that was obtained from pipeline controller 9. This corresponds to stage W. In this case, stage M corresponds to NOP where nothing is performed.

On the other hand, if the instruction being executed is a memory access instruction, a calculation of the memory address to be accessed is executed at execution unit 11. A memory address 12 that is obtained is passed to a data memory access controller 14. Data memory access controller 14 performs reading and writing of data memory 19 through data memory bus 18. This corresponds to stage M. The execution of an instruction to write to memory is completed by an execution in data memory access controller 14. In this case, stage W corresponds to NOP. The execution of an instruction to read from memory completes when data 17 that was read is written to the general-purpose register through general-purpose register write controller 15, namely, at the same time when stage W completes.

Processor 40 further includes an interrupt signal input unit 27 for inputting an external interrupt signal 28. When an interrupt signal is input, pipeline controller 9 is notified of the input.

On the other hand, coprocessor 50 performs data transfers with processor 40 through buses, namely, a coprocessor input bus 20 including operation result 16 in processor 40 and data 17 that was read from data memory 19, a coprocessor input control bus 21 including signals to control inputs, such as of data, to coprocessor 50, a coprocessor output control bus 23 including signals to control outputs of data from coprocessor 50, and a coprocessor output bus 24 including operation result data and state signals that were output from the coprocessor.

Coprocessor input bus 20 and coprocessor input control bus 21 are referenced at a coprocessor input controller 30. Coprocessor input controller 30 determines whether data should be input to one of the registers in coprocessor 50 as well as avoiding an input overflow of data to coprocessor 50.

A coprocessor execution unit 31 performs an operation when coprocessor input controller 30 accepts a data input. The operation result is supplied to a coprocessor output controller 32 and stored in an output register. Coprocessor output controller 32 references coprocessor output control bus 23, determines a register to which data should be output, and controls the output of data from the register. The data that is output is supplied to processor 40 through coprocessor output bus 24. Coprocessor output controller 32 further outputs the condition of the operation execution and the state of the data input overflow judged in coprocessor input controller 30 to coprocessor output bus 24, and offers information to pipeline controller 9 in processor 40 necessary for a stage progress suspension, a cancellation of an instruction, or a re-execution of an instruction.

Figure 3:
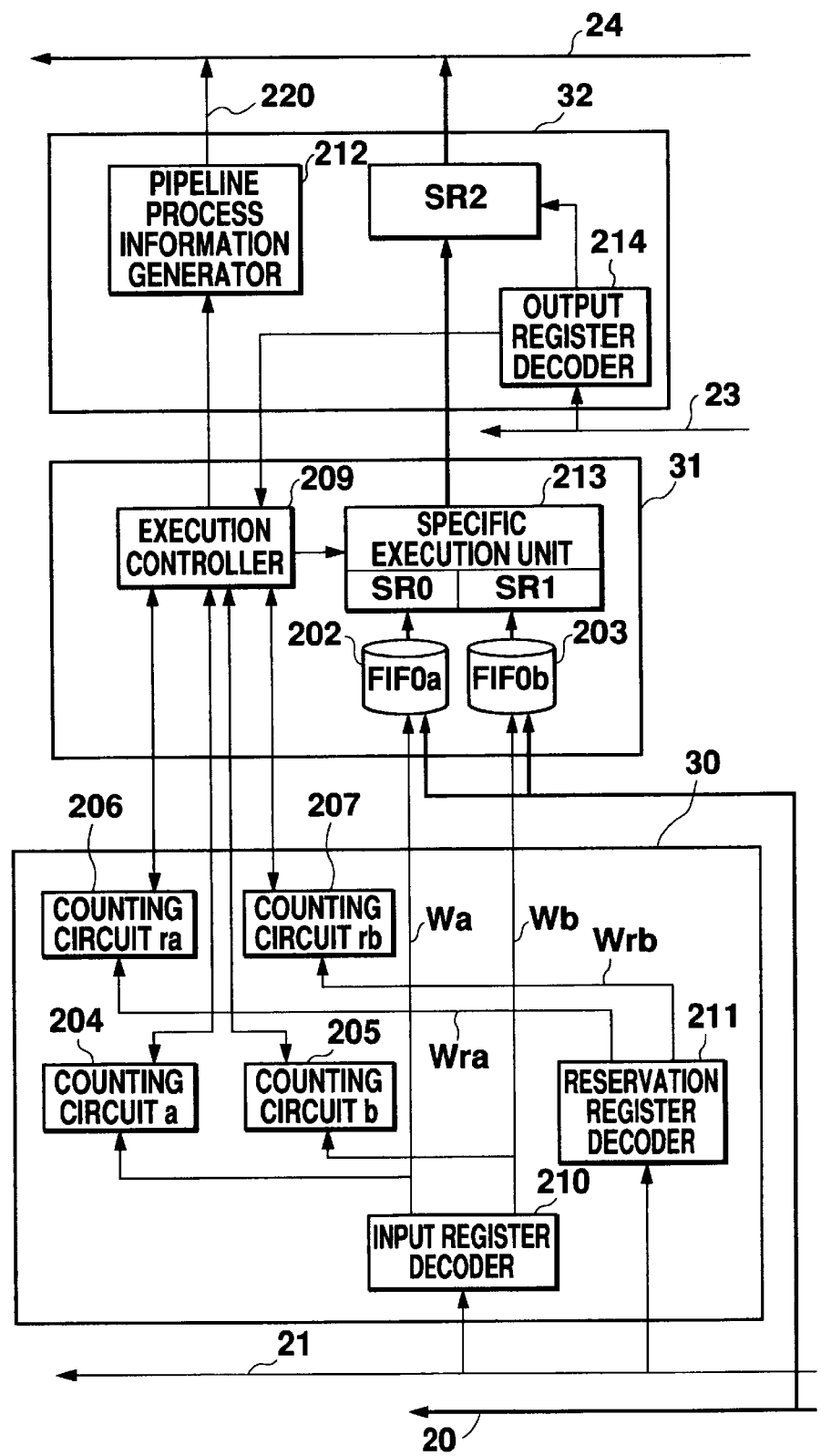
FIG. 3: Figure showing an internal organization of a coprocessor.

FIG. 3 shows the internal organization of coprocessor 50. In this figure, a specific execution unit 213 within coprocessor execution unit 31 is the one that performs operations, and the execution of operations is controlled by an arithmetic controller 209. Specific execution unit 213 performs operations specific to the coprocessor (mainly dyadic operations), such as floating-point arithmetic, in addition to the ordinary multiplication and division operations. Data on which operations are to be performed is supplied to specific execution unit 213 by two input registers SR0 and SR1, which are provided together with specific execution unit 213. Operation results are stored by an output register SR2 within coprocessor output controller 32. Output register SR2 outputs operation results to coprocessor output bus 24. Although the output register is shown here as a single unit, there may be a multiple number of units, in which case an output register decoder 214 selects a register that is to output data to the bus.

In this embodiment, a FIFOa 202 and a FIFOb 203 are provided in front of input registers SR0 and SR1, respectively. They are connected directly to coprocessor input bus 20, and can store data supplied from processor 40. When processor 40 commands the coprocessor to execute an operation, an input register decoder 210 decides whether a data input to one of input registers SR0 and SR1 should be performed. This decision is performed by input register decoder 210 looking at a coprocessor register number that was placed on coprocessor input control bus 21. A write command signal Wa or Wb is output from input register decoder 210 to the FIFO where data is to be input, at which time the data that was placed on coprocessor input bus 20 is written to FIFOa 202 or FIFOb 203. Specific execution unit 213 fetches data from FIFOa 202 and FIFOb 203 each time an operation being executed completes, and starts a new dyadic operation.

In this embodiment, the operation initiation instruction simply represents data transfer instructions for coprocessor 50. In other words, an instruction for explicitly initiating an operation is unnecessary, and an operation is initiated by the data transfer instructions for SR0 and SR1 given below. This is performed at stage W (write to register) in processor 40.

LD SR0, (R0): Load data at address R0 in memory to SR0
LD SR1, (R1): Load data at address R1 in memory to SR1

Specific execution unit 213 starts an operation as soon as data has been loaded into SR0 and SR1. On the other hand, in this embodiment, the operation result fetch instruction represents a read instruction from coprocessor 50. In other words, the instruction given below performs reading of operation results.

ST SR2, (R2): Store data of SR2 into address R2 in memory

This is performed at stage A of processor 40.

The overall path in coprocessor 50 of the FIFO storage, input registers SR0 and SR1, specific arithmetic logic unit, and output register SR2 comprises a pipeline having a FIFO structure. Processing in this pipeline has a certain synchronous relationship with the stages in the pipeline at processor 40. When data is written to SR0 and SR1 in coprocessor 50 at stage W of processor 40, this initiates an operation. The operation result is read from SR2 at stage A.

As described later, the operation result fetch instruction waits for the completion of an operation in coprocessor 50 at stage R. At stage R, a cancellation of operation will be acknowledged since the state of hardware resources is not yet changed. As a result, it is possible to immediately accept an interrupt request, for example, at stage R. In this embodiment, instructions are not canceled from and after stage A where the state of hardware resources can change.

In FIG. 3, counting circuits a 204 and b 205 are counters for incrementing count values when the aforementioned write command signals Wa and Wb are output, respectively. When output register decoder 214 commands the output of data to SR2, these counting circuits are notified of this through arithmetic controller 209 and decrement the count values. Therefore, these counting circuits indicate numbers of data items stored in FIFOa 202 and FIFOb 203, respectively, and are referenced by optional circuits (not shown) for optional purposes.

On the other hand, counting circuits ra 206 and rb 207 are counters for incrementing count values according to write command signals Wra and Wrb from a reservation register decoder 211, respectively, and decrementing count values under conditions similar to those for the aforementioned counting circuits a 204 and b 205. Write command signals Wra and Wrb are output from reservation register decoder 211 when an instruction decoded by instruction decoder 5 in processor 40 announces in advance write operations for SR0 and SR1, respectively. Therefore, the number of increments in counting circuits ra 206 and rb 207 is, as a result, the same as that in counting circuits a 204 and b 205, but with earlier increment timing. The count values of counting circuits ra 206 and rb 207 indicate sums of the number of data items actually stored in FIFO a 202 and b 203 and the number of data items to be stored in the near future. If specific execution unit 213 always performs dyadic operations, one of either counting circuit a 204 or b 205 is sufficient. However, to implement operations where a value of SR0 is successively added to the operation result, it is necessary to include both counting circuits separately.

Figure 4:
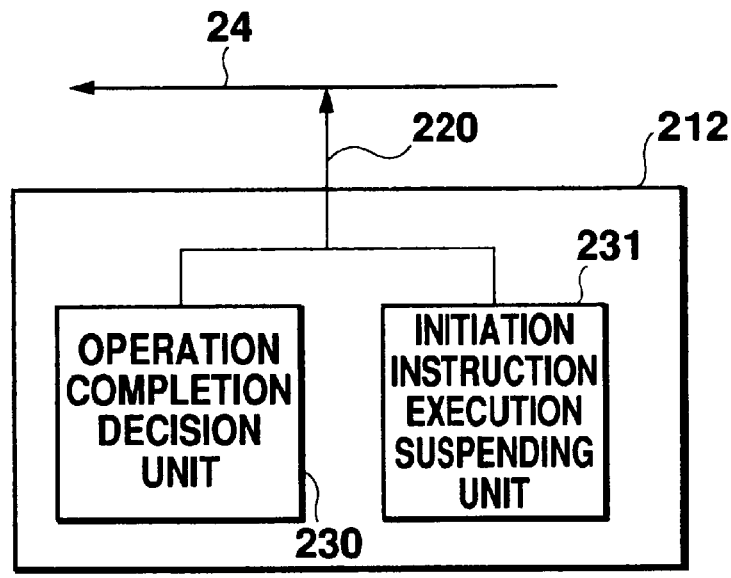
FIG. 4: Internal block diagram of a pipeline process information generator.

Coprocessor output controller 32 further includes a pipeline process information generator 212. FIG. 4 shows its internal block diagram. According to the figure, this configuration includes an operation completion decision unit 230 and an initiation instruction execution suspending unit 231, which output a coprocessor ready signal (hereinafter simply "ready signal") 220. Operation completion decision unit 230 detects the completion of an operation, not through software-based polling, but through hardware-based monitoring of the state of a sequencer within the arithmetic logic circuit. This is done because polling introduces a considerable overhead.

The outputs of operation completion decision unit 230 and initiation instruction execution suspending unit 231 are connected, for example, in a wired OR logic circuit. Ready signal 220 is a signal for processor 40 to perform handshaking for processing with coprocessor 50 and is output under the conditions given below.

(1) Data transfer instruction to SR0

Taking reservations also into consideration, when the value of counting circuit ra 206 is smaller than the number of data items that can be stored in FIFO a 202

(2) Data transfer instruction to SR1

Similarly, when the value of counting circuit rb 207 is smaller than the number of data items that can be stored in FIFO b 203

(3) Data transfer instruction from SR2

When an operation result is present in the output register

Among these conditions, ready signal 220 is output respectively by the aforementioned initiation instruction execution suspending unit 231 for (1) and (2), and by the aforementioned operation completion decision unit 230 for (3). Ready signal 220 is output from coprocessor 50 at stage R of the respective instruction and referenced from processor 40 in the same stage. When ready signal 220 is output, processor 40 issues an instruction that is currently expected to be issued among the aforementioned (1)–(3). The cancellation or re-execution of the instruction becomes possible through referencing at stage R.

Figure 5:
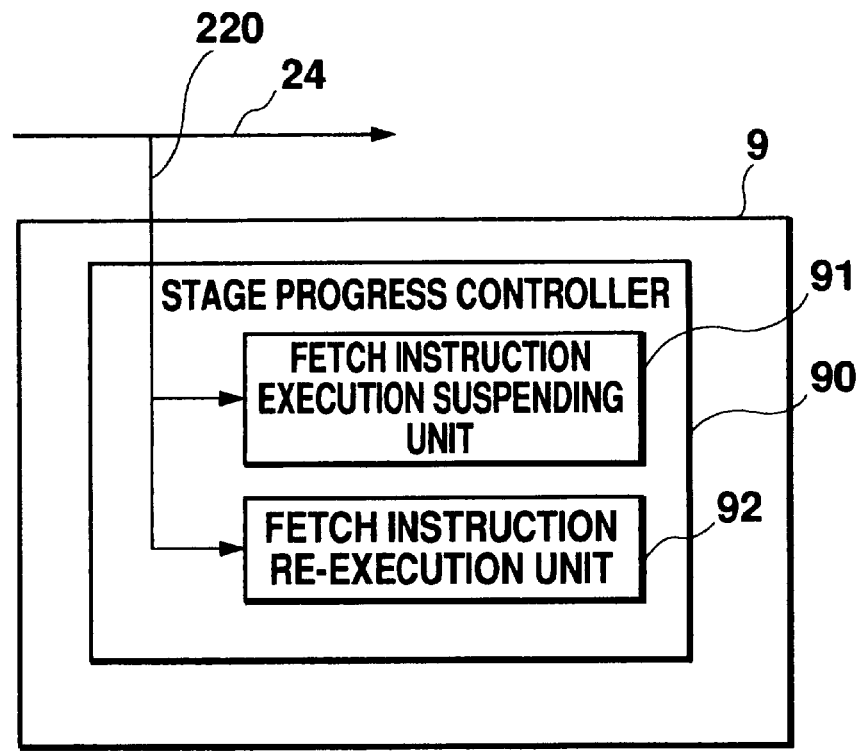
FIG. 5: Figure showing a part of pipeline controller 9 in processor 40.

FIG. 5 shows part of the internal configuration of pipeline controller 9 in processor 40. Pipeline controller 9 includes a stage progress controller 90, and stage progress controller 90 includes a fetch instruction execution suspending unit 91 and a fetch instruction re-execution unit 92. Fetch instruction execution suspending unit 91 references ready signal 220, and until coprocessor 50 enters a ready state, suspends the issuance of an operation result fetch instruction that fetches an operation result from coprocessor 50. If an operation result fetch instruction was canceled by the occurrence of an interrupt, fetch instruction re-execution unit 92 re-executes the instruction from stage I.

Operation

Operations based on the aforementioned configuration is described with an emphasis on pipeline related operations.

Figure 6:
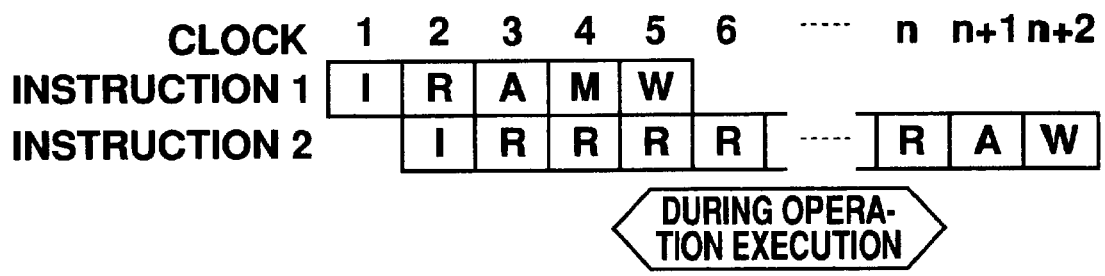
FIG. 6: Figure showing a pipeline process when an operation initiation instruction and an operation result fetch instruction are executed by an apparatus of this embodiment.

FIG. 6 shows a pipeline process when the operation initiation instruction (designated as "INSTRUCTION 1" in the figure) and the operation result fetch instruction (designated as "INSTRUCTION 2") are executed by the apparatus of this embodiment. In reality, instruction 1 comprises two instructions:

LD SR0, (R0)

LD SR1, (R1)

However, for the convenience of the description herein, it will be depicted as one instruction. On the other hand, instruction 2 comprises:

ST SR2, (R2).

First, instruction 1 is executed. Since instruction 1 only initiates an operation, stages I through W are each completed in one clock. Since the writing of data on which operations are to be performed to a register in coprocessor 50 completes at stage W (or more precisely, at the first half of the stage), the operation by coprocessor 50 starts from stage W (or more precisely, from a certain time when the stage is halfway completed).

On the other hand, processor 40 starts stage I for instruction 2 in parallel with stage R for instruction 1. Instruction 2 requires the operation result of instruction 1 so its issuance is delayed until the completion of the operation. During operation execution, operation completion decision unit 230 in FIG. 4 does not output ready signal 220 and maintains a not-ready state. In the same figure, during operation execution, instruction 2 repeats stage R and does not progress to stage A until clock (n+1) which is after completion of the operation.

Figure 7:
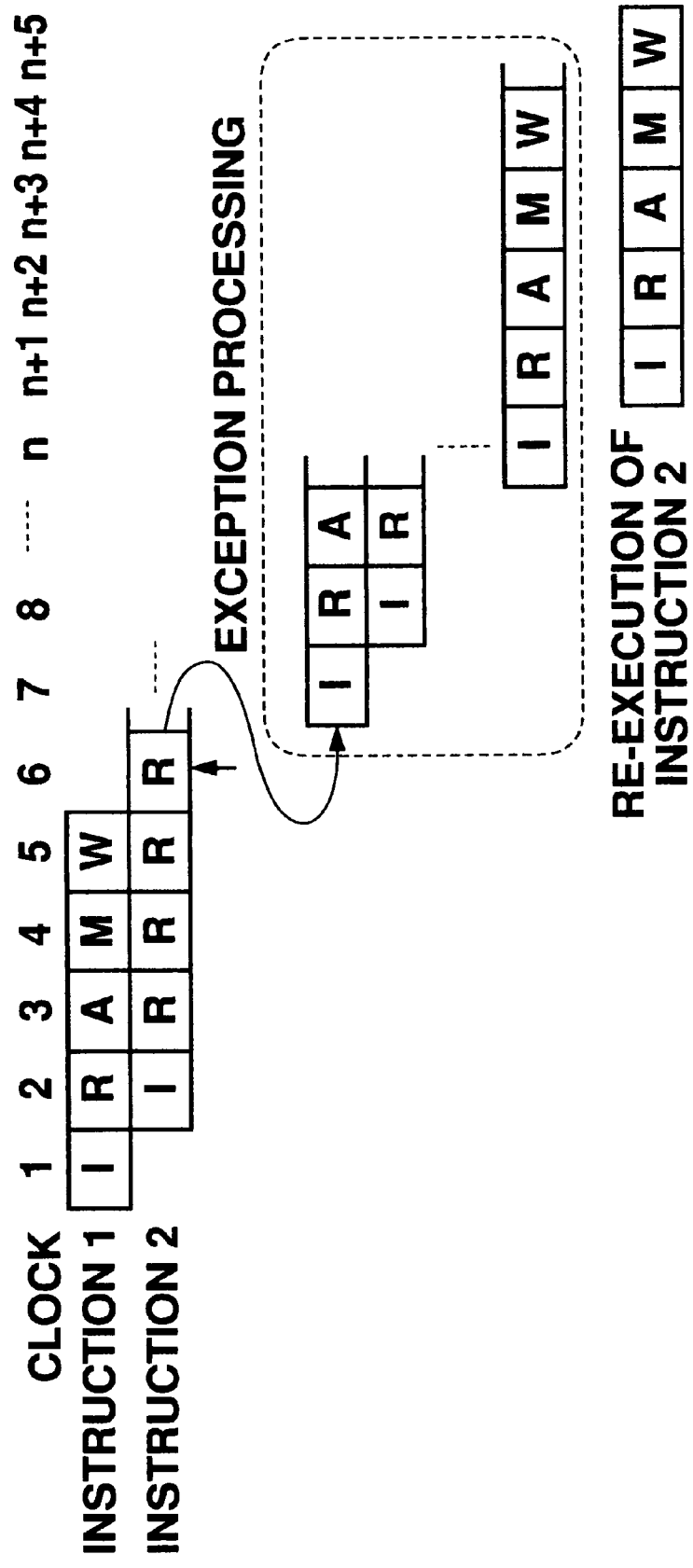
FIG. 7: Figure showing a pipeline process when an interrupt request has been issued with instruction 2 at stage R.

FIG. 7 shows a pipeline process when an interrupt request was issued for processor 40 with instruction 2 at stage R. In the same figure, an arrow at clock 6 indicates the timing for the interrupt request generation. Processor 40 cancels instruction 2 at clock 7 and an instruction fetch by instruction fetch unit 3 jumps to the top address of an interrupt handler. Thereafter, the handler process is performed in the same manner by the pipeline, and after this ends, instruction 2 is re-executed from stage I by fetch instruction re-execution unit 92 in FIG. 5.

Therefore, in this embodiment, dividing the execution of an operation by coprocessor 50 into the two phases of operation initiation and operation result fetch permits an immediate response to an interrupt request. If instruction 1 is an instruction combining an operation initiation and a result read, such as MUL SR2, SR0, SR1: Product of SR0 and SR1 is stored into SR2 instruction 1 in FIG. 7 may continue for an extended time at stage A (operation), and since a cancellation of an instruction at stage A is not allowed, the interrupt request could be delayed for a long period of time. In this embodiment, even if instruction 2 is canceled, the execution of the operation is continued by coprocessor 50 so there is hardly any problem in processing performance.

In this embodiment, the concept of a reservation was introduced. In other words, a reservation of FIFOa 202 and FIFOb 203 within coprocessor 50 is made by reservation register decoder 211 and counting circuits ra 206 and rb 207 in FIG. 3. If a full state results from the reservations, initiation instruction execution suspending unit 231 in FIG. 4 delays the issuance of the next operation initiation instruction so that an overflow state of data input to coprocessor 50 is avoided. Conversely, for data which has been permitted for input to coprocessor 50, operations are guaranteed to always perform smoothly. In this embodiment, the writing of data to coprocessor 50 is performed at the final stage W of an instruction. Therefore, at stage A of a subsequent instruction, even if FIFOa 202 and FIFOb 203 still have space, it is possible for this to be occupied at stage W for the previous instruction. Thus, the reservation operation is both necessary and useful so that the precise amount of open space can be known at stage A.

The above has been an overview of the embodiment. However, the improvements or modifications given below are possible for the embodiment.

(1) In this embodiment, an operation for coprocessor 50 was directly initiated by the data transfer instruction. However, this is not necessary. For example, a similar effect can also be obtained through the use of an explicit operation start instruction, such as ADD, as the operation initiation instruction.

(2) The operations by coprocessor 50 are not limited to such ordinary operations as monadic operations and product and sum operations. For example, operations apart from numerical operations may be assigned to coprocessor 50, such as control of communications with peripheral devices and communication control between processors in a multiprocessor apparatus.

(3) A five-stage pipeline was described herein. However, the pipeline may comprise any number of stages and any of the processing stages.

(4) In this embodiment, the judgement of operation completion was performed at coprocessor 50. However, this may be performed at processor 40. In the actual design, a distinct boundary line between processor 40 and coprocessor 50 either cannot or need not be drawn. Particularly with regard to the configurations in FIG. 4 and FIG. 5, it should be noted that there are many alternatives from which similar effects are obtained.

(5) Although a RISC processor was given in this embodiment as an example, a CISC or other architecture may of course be used instead.

(6) Although the generation of an interrupt request was given as the major cause for instruction cancellation in this embodiment, any other cause, such as exception processing, is also possible.

(7) The execution of instructions was suspended at stage R in this embodiment. If a different pipeline configuration is adopted, the execution can be suspended at a different stage. From a design standpoint, it is preferable, but not absolutely necessary, to suspend the execution at a stage prior to modifying the state of hardware resources.

While there has been described what is at present considered to be the preferred embodiment of the invention, it will be understood that various modifications may be made thereto, and it is intended that the appended claims cover all such modifications as fall within the true spirit and scope of the invention.

What is claimed is:

1. A method for executing operations comprising the steps of:

providing an operation initiation instruction having multiple stages for indicating the initiation of an operation, and an operation result fetch instruction having multiple stages for fetching the result of the operation separately;

judging through hardware completion of execution of an operation that was initiated by the operation initiation instruction; and suspending, until the execution of the operation completes, execution of a corresponding operation result fetch instruction in a state where the operation result fetch instruction is capable of being canceled, wherein the suspension occurs at one of the multiple stages of the operation result fetch instruction.

2. The method according to claim 1, wherein a request for exception processing is accepted even before completion of execution of the operation that was initiated by said operation initiation instruction, and said operation result fetch instruction being suspended is canceled when the request for exception processing is actually generated.

3. The method according to claim 2, wherein an exception processing is performed after said operation result fetch instruction is canceled, and said operation result fetch instruction is re-executed from the beginning after the exception processing is performed.

4. The method according to claim 1, wherein instructions are executed by pipeline processing, and judgment of completion of execution of the operation that was initiated by said operation initiation instruction is performed as a part of the pipeline processing operation when stage progress in the pipeline is controlled while monitoring the execution state of the instruction.

5. A method for executing operations according to claim 1, wherein the operation result fetch instruction is canceled at the one of the multiple stages before changing hardware resources to carry out the operation.

6. An apparatus for executing operations, including:

an operation execution section in which an operation is initiated in response to an operation initiation instruction having multiple stages and an operation result is fetched in response to an operation result fetch instruction having multiple stages;

an operation completion decision section for judging through a hardware completion of execution of the operation that was initiated by the operation initiation instruction; and a fetch instruction execution suspending section for suspending, until the complete execution of the operation, execution of a corresponding operation result fetch instruction in a state where the operation result fetch instruction is capable of being canceled, wherein the suspension occurs at one of the multiple stages of the operation result fetch instruction.

7. The apparatus according to claim 6, further including a pipeline control section for executing instructions through pipeline processing, wherein the pipeline control section includes said fetch instruction execution suspending section.

8. The apparatus according to claim 7, wherein said fetch instruction execution suspending section suspends, until the execution completion of said operation is made, execution of the operation result fetch instruction at a related pipeline processing stage.

9. The apparatus according to claim 8, wherein said fetch instruction execution suspending section suspends, at a stage no later than a stage where the operation result fetch instruction is to be decoded, the execution of the instruction thereof.

10. The apparatus according to claim 9, wherein said pipeline control section includes a fetch instruction re-execution section for re-executing, when a request for exception processing is generated while the execution of the operation result fetch instruction is being suspended, the execution of the operation result fetch instruction after the exception processing is performed.

11. The apparatus according to claim 6, further including a reservation section for making a reservation to use said operation execution section when the operation initiation instruction is decoded.

12. The apparatus according to claim 11, further including an initiation instruction suspending section for suspending the execution of the operation initiation instruction according to a condition of said reservation.

13. The apparatus according to claim 12, wherein said operation execution section comprises a FIFO structure to which data to be operated on is sent through execution of the operation initiation instruction and from which operation result data is fetched through execution of the operation result fetch instruction.

14. The apparatus according to claim 13, wherein said initiation instruction suspending section suspends the execution of the operation initiation instruction comparing a number of stages in said FIFO structure with a number of said reservations.

15. The apparatus according to claim 6, wherein said operation execution section is a coprocessor.

16. The apparatus according to claim 6, wherein said operation initiation instruction is an instruction for supplying data to said operation execution section.

17. The apparatus according to claim 6, wherein said operation result fetch instruction is an instruction for reading data from said operation execution section.

18. The apparatus according to claim 6, wherein the operation result fetch instruction is canceled at the one of the multiple stages before changing hardware resources to carry out the operation.

19. An apparatus for executing operations through pipeline processing, comprising a main path of the pipeline processing and a subpath, which is a detour around part of the main path, for assuming part of the processing, wherein said subpath includes an operation execution section composed so that an operation is initiated in response to an operation initiation instruction having multiple stages and an operation result is fetched in response to an operation result fetch instruction having multiple stages, and wherein said main path includes an operation completion decision section for judging through hardware completion of execution of the operation that was initiated by the operation initiation instruction, and a fetch instruction execution suspending section for suspending, until the execution of the operation completes, execution of a corresponding operation result fetch instruction in a state where the operation result fetch instruction is capable of being canceled, wherein the suspension occurs at one of the multiple stages of the operation result fetch instruction.

20. The apparatus according to claim 19, wherein said main path is formed by a main processor and said subpath is formed by a coprocessor.

21. The apparatus according to claim 19, wherein the operation result fetch instruction is canceled at the one of the multiple stages before changing hardware resources to carry out the operation.

* * * * *